United States Patent
Aponte Luis (10) Patent No.: US 10,754,054 B2
(45) Date of Patent: Aug. 25, 2020

(54) DOMESTIC SECURITY SYSTEM

(71) Applicant: ONTECH SECURITY, S.L., La Riconada (ES)

(72) Inventor: Juan Aponte Luis, La Rinconada (ES)

(73) Assignee: ONTECH SECURITY, S.L., La Rinconada (Sevilla) (ES)

(*) Notice: Subject to any disclaimer, the term of this patent is extended or adjusted under 35 U.S.C. 154(b) by 317 days.

(21) Appl. No.: 15/563,452

(22) PCT Filed: Apr. 1, 2016

(86) PCT No.: PCT/ES2016/070225
§ 371 (c)(1),
(2) Date: Sep. 29, 2017

(87) PCT Pub. No.: WO2016/156654
PCT Pub. Date: Oct. 6, 2016

(65) Prior Publication Data
US 2018/0120466 A1   May 3, 2018

(30) Foreign Application Priority Data

Apr. 1, 2015 (EP) .................................. 15162297

(51) Int. Cl.
*G01V 3/08* (2006.01)
*G01V 3/12* (2006.01)
*G01C 1/00* (2006.01)

(52) U.S. Cl.
CPC . *G01V 3/08* (2013.01); *G01V 3/12* (2013.01)

(58) Field of Classification Search
CPC ........ H01L 21/00; H01L 2221/00; G01C 1/00; H01Q 1/00
See application file for complete search history.

(56) References Cited

U.S. PATENT DOCUMENTS

| | | | |
|---|---|---|---|
| 2003/0030299 A1* | 2/2003 | Cleland ................. | E05F 1/1091 296/146.8 |
| 2011/0232917 A1* | 9/2011 | Skinner ................. | E21B 34/066 166/373 |
| 2011/0267046 A1* | 11/2011 | Cattin ................. | G01R 33/025 324/225 |
| 2012/0091993 A1* | 4/2012 | Uramoto ................. | H02J 7/025 324/105 |
| 2013/0069785 A1* | 3/2013 | Subramanian ..... | G08B 13/2431 340/572.3 |
| 2016/0247027 A1* | 8/2016 | Tsoi ....................... | H04N 7/183 |

* cited by examiner

*Primary Examiner* — Jermele M Hollington
*Assistant Examiner* — Temilade S Rhodes-Vivour
(74) *Attorney, Agent, or Firm* — Arent Fox LLP (57) ABSTRACT

Home security system installed in an enclosure, window or door and comprising un controlled magnetic field sensor (3) connected to an antenna (4) configured as a single electrode, in such a way that said sensor measures disturbances of the magnetic field around said antenna; and is characterized in that the controlled magnetic field sensor is configured to detect a disturbance in the magnetic field detected by its antenna and establish if there is a presence of a person depending on the power of the disturbance; and send an alert for the presence of a person.

15 Claims, 8 Drawing Sheets

DOMESTIC SECURITY SYSTEM

CROSS-REFERENCE TO RELATED APPLICATION

This application is a 35 U.S.C. 371 National Phase of PCT Application No. PCT/ES2016/070225 filed Apr. 1, 2016 which claims priority to EP Application No. 15162297.4 filed Apr. 1, 2015. The disclosure of these prior applications are hereby incorporated by reference herein.

The object of the invention is a home security system. The invention has its practical application in the security sector, and more specifically in private or domestic security in properties, being its main aim an intrusion detection through a door, window, or fence, although it can be used in other locations such as walls or wall.

STATE OF THE ART

Currently, in the field of private security for indoor spaces, different types of devices capable of detecting an intrusion into a home or similar are used. Among the different types of detection devices are the following:
 a) Volumetric sensors, which detect changes in the volume of the measuring area and translate them into motion detection.
 b) Door-opening Sensors that detect when a door or window is opened or closed.
 c) Infrared barrier sensors that detect the passage of an object between their transmitters and receivers.
 d) Vibration or glass break sensor that detect vibration in crystals when they are beaten or suffer a break.

All these devices have in common that are installed inside a house. Therefore, they do not offer a preventive security, since they are only capable of detecting an intrusion when this has already happened. Therefore, it is not a preventive security system, but an event warning or alarm system. On the other hand, both volumetric sensors and infrared barrier sensors are unable to, in addition, discriminate the types of moving objects or the different movements that occur within its range.

To avoid these problems, the best solution is the electrostatic field sensors. However, most of the documents are based on uncontrolled signals and on the indirect measure of capacity depending on the variation in the resonance frequency of the signal and/or in its impedance.

For example, the document ES 2152335 T3 describes a detector device connected to an antenna for detecting small capacitive changes in an electric or electromagnetic field around the antenna, said device comprising: generating means for generating an electric or electromagnetic field around said antenna; balancing means for maintaining the generated electric or electromagnetic field around said antenna in a balanced condition; filtering means for preventing the detector device from being affected by changes in the temperature and humidity; detection means for detecting small changes in the generated electric or electromagnetic field around said antenna; and indicating means for indicating that a change in the electric or electromagnetic field has occurred; and characterized in that the generating means are a square wave generator, preferably generating a square wave between 50 Hz and 5000 Hz, and in that the unaffected square wave from said generator and the square wave capacitively affected by the field surrounding the antenna are fed to amplifier means to amplify the difference thereof.

Thanks to this detector device, it is achieved a security system in a first presence area indicating that the intruder has approached the protected object at a distance of between 100 and 150 cm; a second presence area which indicates that the intruder has approached the object protected at a distance of 30 cm; and a third presence area which indicates that the intruder almost makes contact with the protected object.

Therefore, this invention creates a square wave, wherein depending on the variation of the frequency of the same the related capacity can be calculated. This signal creates a magnetic field in the conductor which is out of control, i.e., its field lines extend in all directions and, in addition, undergoes variations with the temperature, humidity and other conditions, so it needs to correct these problems.

In general, none of the documents in the State of the art describes a system capable of measuring the disturbance in a single antenna and, thereafter, inferring the presence of a person, distinguishing it from animal or thing through the measurement of the disturbance itself on the single antenna. This disturbance detection also involves a change in the topology of circuits used against the solutions with transmitter and receiver solutions (as in documents US2004090234 and U.S. Pat. No. 5,914,610).

DESCRIPTION OF THE INVENTION

The object of this invention is a home security system capable of measuring disturbances occurring in the electrostatic field around a probe that acts as an electrode or antenna, due to the human presence in its vicinity. This electrostatic field is also redirected in a controlled manner, through the shielding of the unwanted emission area, to focus their influence on a certain area. In addition, the sensor is able to differentiate on the basis of the magnitude of the change, persons from other living beings or material objects. All this is according to the attached claims, which are incorporated herein by reference.

The invention is based on the capacity of sensor object of the invention to measure the variations in the electrostatic field existing around a single conducting element, in the case of the invention a coaxial cable, which acts as a probe or antenna, when said field is affected by the influence of a charged body, such as the human body.

The human body, like any other existing object, has its own electrical characteristics, dependent on the materials, density, volume, temperature and conductivity. The differences in the potential between the different objects result in electrostatic interactions from an object to another when they come into contact or are close to each other. This effect is used by the sensor object of the invention, achieving the continuous measurement of fluctuations that said field causes in an electronic circuit connected to it. This circuit, through the changes in the field magnitude is able to distinguish different types of bodies or objects and to discriminate the human presence from another material or animal presence. Indeed, in carrying out the continuous measurement of the capacity, it moulds the electrical field generated on the antenna and through infinite field lines, a processor connected to the same allows determining the volume and density of material which generates the field fluctuation on the antenna.

The invention is applied to security systems in homes, giving the capacity to detect intrusions proactively in doors, windows and fences or walls, i.e. the detection capability before the intrusion takes place.

Throughout the description and claims, the word "comprises" and its variations are not intended to exclude other technical features, additives, components or steps. For those skilled in the art, other objects, advantages and characteristics of the invention will emerge in part from the description and in part from the practice of the invention. The following examples and drawings are provided by way of illustration, and are not intended to be limiting of the present invention. The following examples and drawings are provided by way of illustration, and are not intended to be limiting of the present invention. Furthermore, the present invention covers all the possible combinations of particular and preferred embodiments herein indicated.

BRIEF DESCRIPTION OF THE FIGURES

There follows a very brief description of a series of drawings that help to provide a better understanding of the invention and which are associated expressly with an embodiment of said invention that is presented as a non-limiting example thereof.

EXPLANATION OF A DETAILED EMBODIMENT OF THE INVENTION

An object of the invention is a home security system comprising interchangeably, a door, a window, a wall or any of the above in combination. Below it is detailed each of the particular embodiments of the parts that make up the system object of the invention.

Embodiment of a Door with the Non-Integrated Security System

Figure 1:
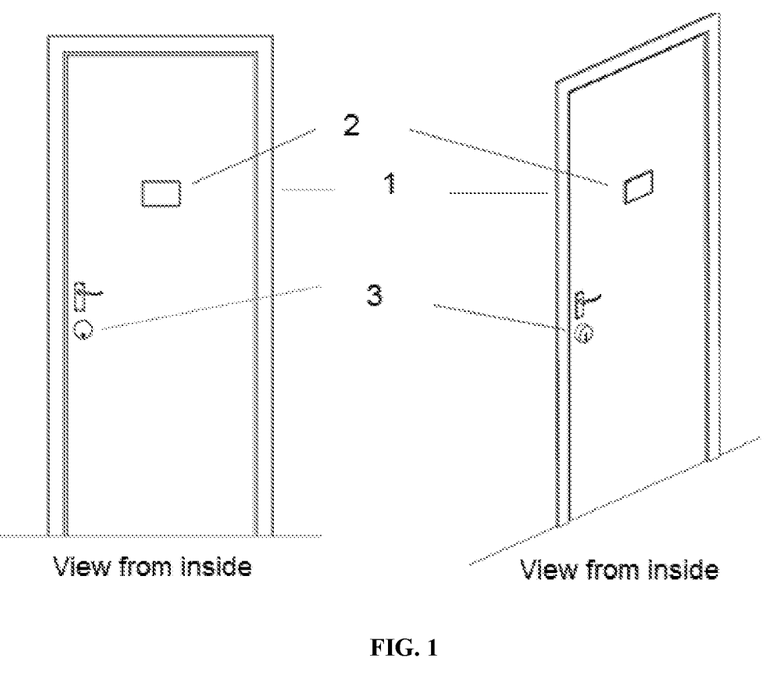
FIG. 1—General scheme of a door with the non-integrated security system.
Figure 2:
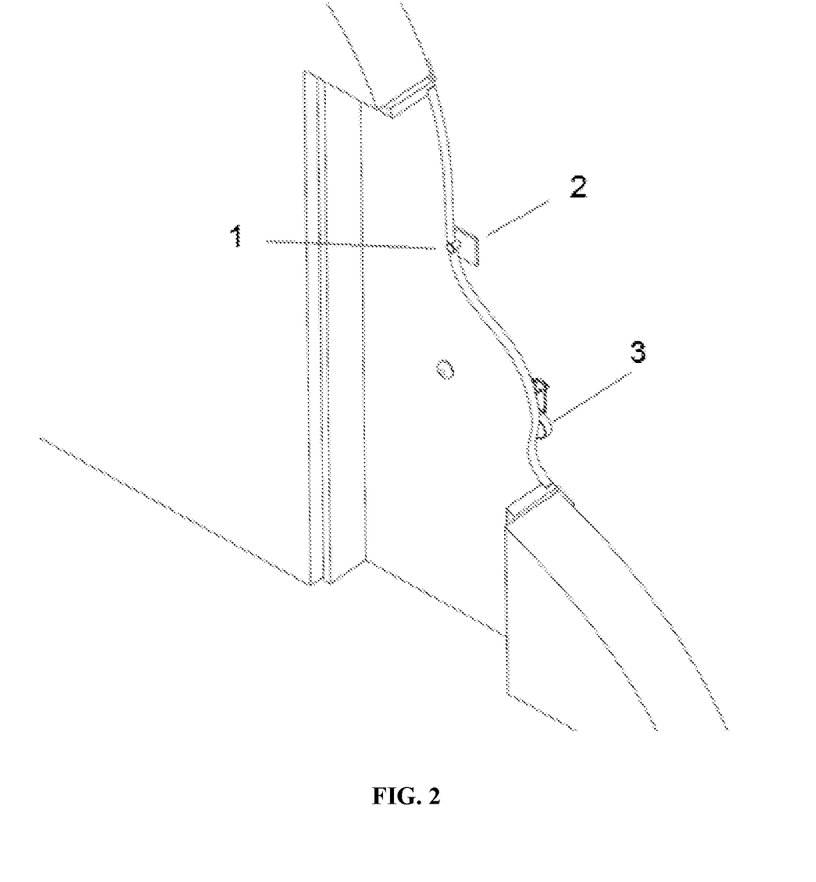
FIG. 2—Schematic detail of the door in FIG. 1.

FIGS. 1 and 2 show an embodiment that now develops the concept of non-integrated Smart door, consisting of providing access doors with the electronics needed (based on the controlled magnetic field technologies plus additional electronics) in order that said door be able to detect by itself the presence of people in its vicinity and make photographs of such persons (in a preventive manner, i.e. when they are still outside of the house) when they are within a proximity radius predefined by the user. This electronics will be additional elements to the door.

The product is constituted as a whole by the following (see FIG. 1 and FIG. 2):

Electronic peephole with integrated camera (1). The camera may be of high or low resolution depending on the model, and may have an optics with apertures between 60 and 140 degrees, depending on model. This peephole may include in a top model, a microphone for audio capture.

LCD display (2) for real-time image visualization. This circuit will include wired or wireless communications circuit to communicate with the sensor. The screen may be LCD or LED, with touch interface or not, depending on model. This display, in top models, may have speakers to reproduce sounds coming from the microphone set out in the preceding paragraph.

Controlled magnetic field sensor (3) as described in PCT/ES2014/070719 located on the door surface in the vicinity of the handle. This circuit will include wired or wireless communications circuit to communicate with the display/peephole. The sensor may have an accelerometer or inclinometer that allows detecting the movement of the door. The sensor may include a personal identification circuit to identify users and inhibit the alarms in the entering and exiting processes. In this case, the sensor antenna will be attached to the door in any position, for example, inside the frame.

Both elements, sensor and electronic peephole plus display, would be powered by rechargeable batteries.

On the one hand, the peephole and display can be used independently to the sensor, so that the device can display images or video of what is happening on the other side of the door where the system is installed. To do this, the device is equipped with a LCD display and a button that will turn on and off the system.

On the other hand, there is a combined functionality Sensor—Peephole in which the controlled magnetic field sensor measures at a measurement frequency preset by the user and when it detects the presence of a person, it sends a presence alert together with the images taken by the camera. Both the number of images obtained and the detection thresholds may be programmable by the user.

The sensor will be equipped with a communications circuit, which can be wired or wireless, that will be used as a means for sending alerts and images to a central system, that may be a physical device or the cloud for later viewing and control from a mobile terminal (phone or Tablet) or a personal computer.

Embodiment of a Door with the Integrated Security System

Figure 3:
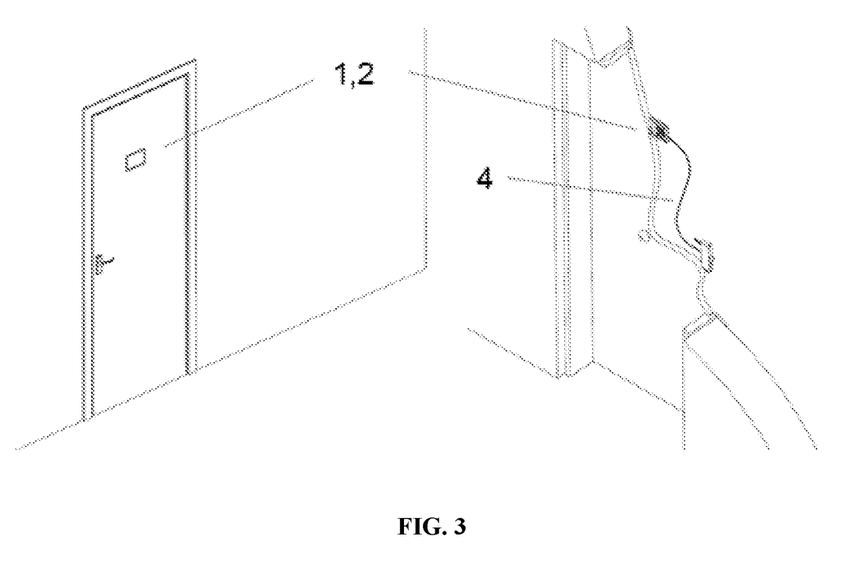
FIG. 3—General scheme of a door with the integrated security system.

In the case of integrated smart door, as shown in FIG. 3, the functionality of the system is the same as in the previous case with the difference that all the elements would be integrated in the door itself, without installation work by the user, and the sensor would be electrically connected to the metal part of the door, which in this case would act as electrode of the single antenna through which it could be measured the disturbances. In this case, the system could be powered by rechargeable batteries or directly power supply, depending on the model and customer.

The operation would be the same as in the previous case, being able to view picture or video on the display after the prior activation by button and detecting system the presence of persons and alerting through attached alarms and images and alarms.

Embodiment of a Window with the Non-Integrated Security System

The concept of non-integrated smart window (FIG. 4) consists of the same concept as the door, but without the display. Therefore, it consists of providing windows with the electronics necessary for the detection of human presence in the vicinity of the same, through controlled magnetic field sensors and a camera that can take photographs or video when the sensor detects presence and goes into mode alert.

Figure 4:
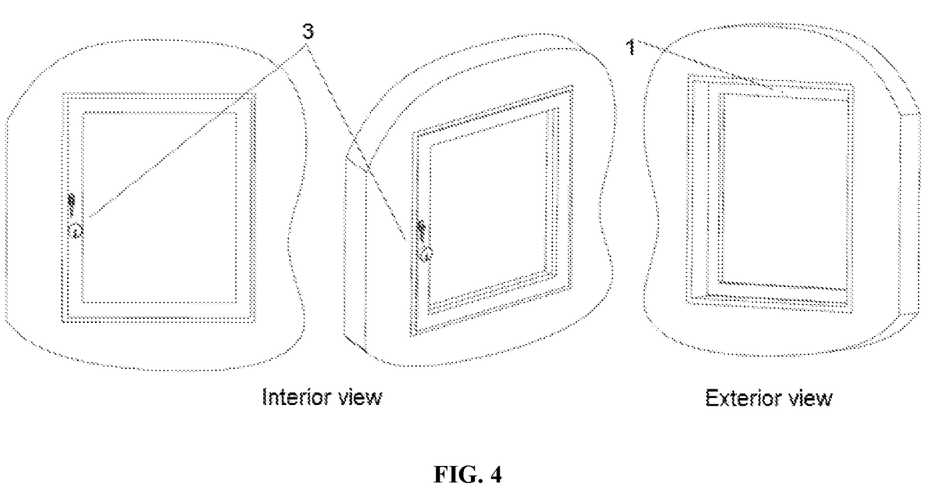
FIG. 4—General scheme of a window with the non-integrated security system.

The product is constituted as a whole by the following:

Camera which may be of high or low resolution depending on the model, and may have an optics with apertures between 60 and 140 degrees, depending on model.

Controlled magnetic field sensor in accordance with PCT/ES2014/070719 located in the window surface. This circuit will include wired or wireless communications circuit to communicate with the camera. The sensor may have an accelerometer or inclinometer that allows detecting the movement of the window. The sensor may include a personal identification circuit to identify users and inhibit the alarms in the window opening processes.

Both elements, sensor and camera, will be powered by rechargeable batteries.

The controlled magnetic field sensor measures at a measurement frequency preset by the user and when it detects the presence of a person, it sends a presence alert together with the images taken by the camera. Both the number of images obtained and the detection thresholds may be programmable by the user.

The sensor will be equipped with a communications circuit, which can be wired or wireless, that will be used as a means for sending alerts and images to a central system, that may be a physical device or the cloud for later viewing and control from a mobile terminal (phone or Tablet) or a personal computer.

Embodiment of a Window with the Integrated Security System

Figure 5:
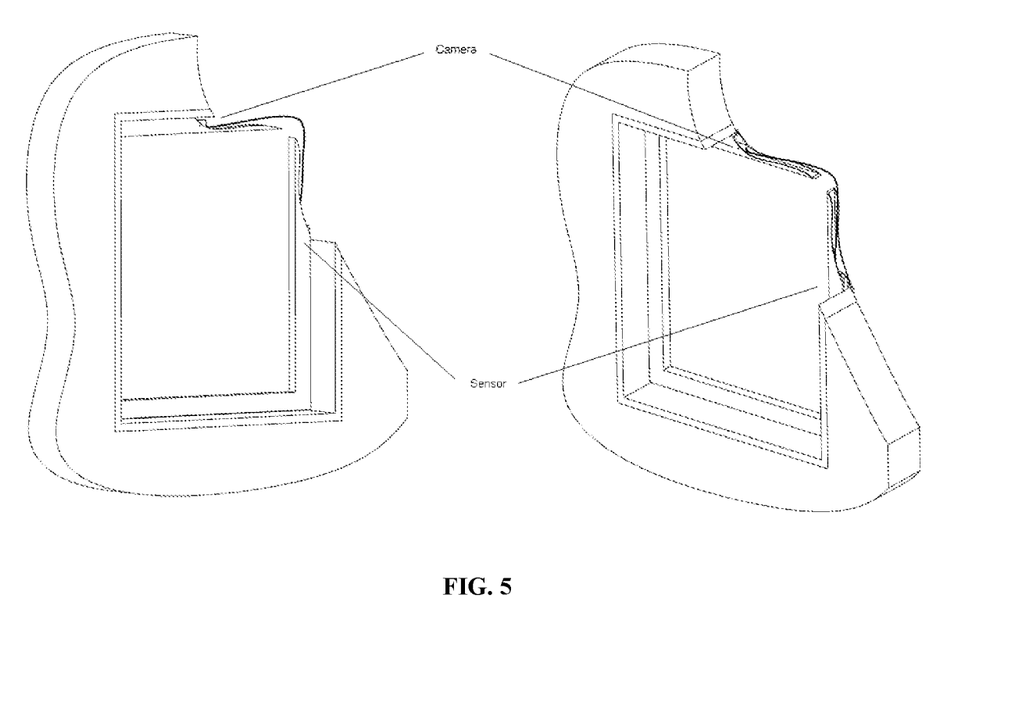
FIG. 5—General scheme of a window with the integrated general system.

In the case of the integrated smart window (FIG. 5), the functionality of the system is the same as in the case of the non-integrated window (FIG. 4) with the difference that all the elements would be integrated in the window itself, without installation work by the user. Therefore, the metal parts of the window are the ones which are electrically connected to the sensor, constituting the antenna's own electrode, through which the sensor measures disturbances. In this case, the system could be powered by rechargeable batteries or directly power supply, depending on the model and customer. The operation would be the same as in the previous case.

Embodiment of a Wall or Inner Enclosure with the Integrated Security System

For external perimeter solutions, the concept of "Smart Wall" is developed with the integrated and non-integrated versions, as in previous cases. In this case, the solution consists of incorporating into the wall an electronics with controlled magnetic field sensors, and one or more electrodes (although each electrode is a transmitting-receiving antenna) installed by way of adhesive tape (FIG. 6) so as to create a detection area on the external side of the wall with a radius of around 1 m (the part oriented toward the interior of the wall will be shielded). In this way, the sensor is able to detect human presence in the vicinity of the wall, reducing the possibility of theft through hole-in-wall technique, or similar.

The product is constituted as a whole by the following (see FIG. 6):
Controlled magnetic field sensor, located on the wall surface. This circuit will include wired or wireless communications circuit to communicate with the central system. The sensor may include a personal identification circuit to identify users and inhibit the alarms when necessary.
Electrode(s) made of adhesive material with a maximum length of 10 metres that serves as a magnetic field generation and measuring element. The electrode will be constructed on flexible and adhesive substrate and will be composed of metal alloys.
It is powered by rechargeable batteries or power supply.

Figure 6:
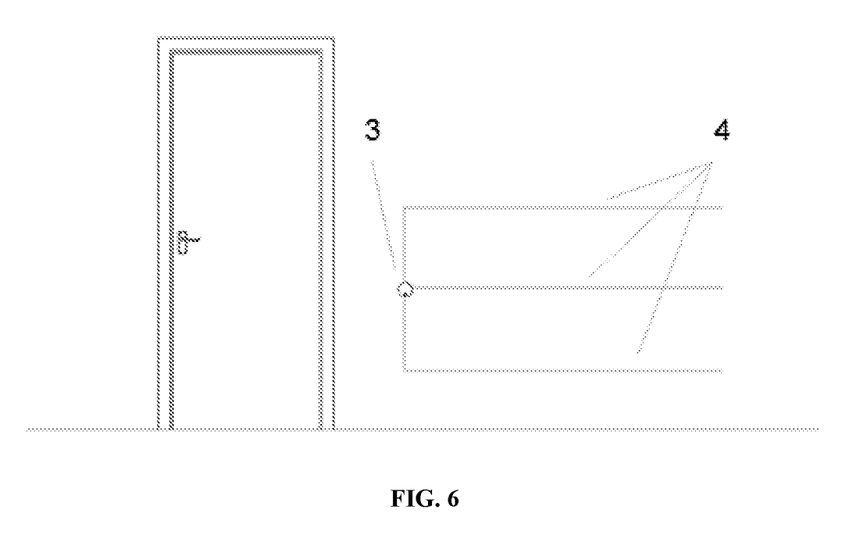
FIG. 6—General scheme of an inner enclosure with the integrated system.

The controlled magnetic field sensor (3) measures at a measurement frequency preset by the user and when it detects the presence of a person, it sends a presence alert. The sensor will be equipped with a communications circuit, which can be wired or wireless, that will be used as a means for sending alerts and images to a central system, that may be a physical device or the cloud for later viewing and control from a mobile terminal (phone or Tablet) or a personal computer.

Embodiment of a Wall or Outer Enclosure with the Integrated Security System

Figure 7:
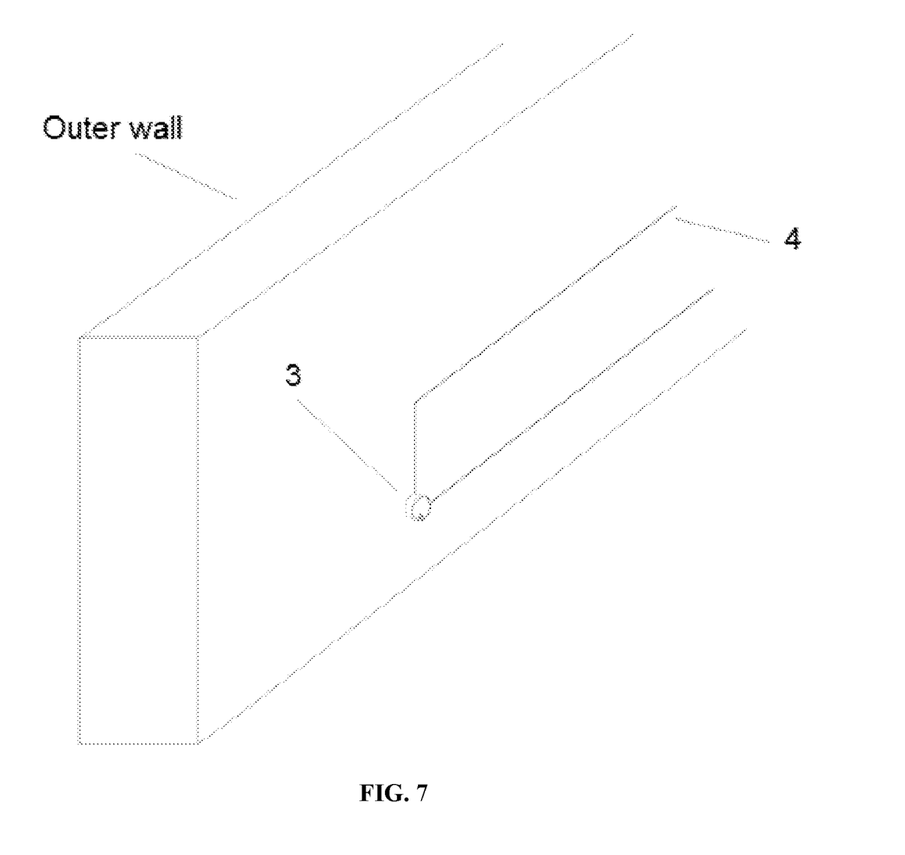
FIG. 7—General scheme of an outer enclosure with the non-integrated system.

For external perimeter solutions, the concept of "Smart Outer Wall" is developed with the integrated and non-integrated versions, as in previous cases. In this case, the solution consists of incorporating into the wall an electronics with controlled magnetic field sensors, and one or more electrodes so as to create a detection area on the internal and external sides of the wall with a radius of around 1 m. In this way, the sensor is able to detect human presence in the vicinity of the wall, reducing the possibility of intrusion or sabotage attempt.

The product is constituted as a whole by the following (see FIG. 7):
Controlled magnetic field sensor, located on the wall surface. This circuit will include wired or wireless communications circuit to communicate with the central system. The sensor may include a personal identification circuit to identify users and inhibit the alarms when necessary.
Electrode(s) with a maximum length of 10 metres that serves as a magnetic field generation and measuring element.
The elements will be powered by rechargeable batteries or power supply.

The controlled magnetic field sensor (3) measures at a measurement frequency preset by the user and when it detects the presence of a person, it sends a presence alert. The sensor will be equipped with a communications circuit, which can be wired or wireless, that will be used as a means for sending alerts and images to a central system, that may be a physical device or the cloud for later viewing and control from a mobile terminal (phone or Tablet) or a personal computer.

Controlled Magnetic Field Sensor (3)

The controlled magnetic field sensor is one as described in the document PCT/ES2013/070719. However, FIG. 8 describes an alternative embodiment to said sensor. As can be seen in said FIG. 8, the electrostatic field sensor comprises an antenna (4) consisting of a single electrode which at the same is transmitter and receiver (transmitting-receiving electrode) and it is the antenna (4) used in all and each one of the above embodiments, although in some cases it is connected with the metal parts of the door or window (embodiments in FIGS. 3, 5 and 6). It must be taken into account that in some embodiments, several antennas can coexist in parallel, even though each of them retains the particularity of being transmitter and receiver at the same time.

Figure 8:
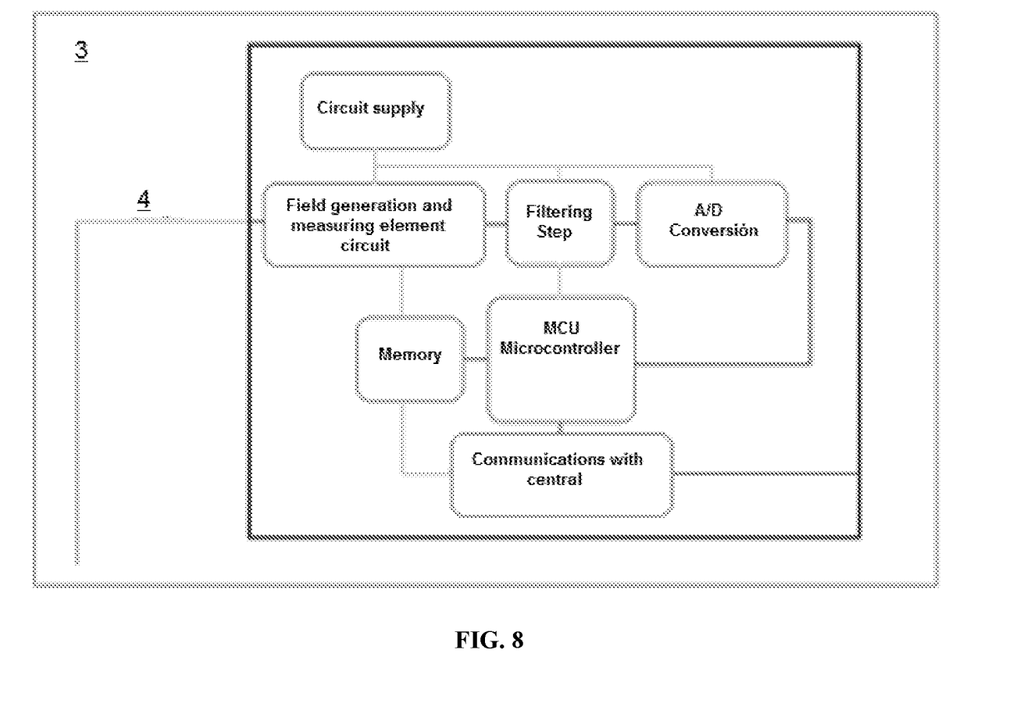
FIG. 8—Block diagram of a sensor according to the invention.

However, the controlled magnetic field sensor also comprises a field generation and measurement circuit, preferably a tuner circuit with operating frequency less than 5 MHz comprising an RLC circuit and a phase-stabilizing circuit. The signal received at the antenna, after the measurement, passes by a filtering stage and, subsequently, said signal pass to an analog-digital converter, which in turn is connected to a processor configured to detect the variations in the electrostatic field, establishing a kind of three-dimensional map with such variations, being able to determine the volume and density of the object that said variation has generated. This processor, in turn, is connected to a radio frequency circuit which emits a signal encrypted towards a switchboard or external integrated surveillance system, which controls the entire installation. The circuit is completed by a data storage memory.

The invention claimed is:

1. A door comprising:
   an electronic peephole with an integrated camera;
   a display; and
   a controlled magnetic field sensor connected to an antenna comprising a single electrode, which at a same time is a transmitter and a receiver of an magnetic field, such that said controlled magnetic field sensor measures disturbances of the magnetic field around said antenna;
   wherein the controlled magnetic field sensor is configured to:
      detect a disturbance in the magnetic field detected by the antenna and establish if there is a presence of a person depending on a power of the disturbance; and
      send an alert for the presence of the person together with images taken by the integrated camera; and
   wherein the controlled magnetic field sensor comprises a processor configured to:
      perform continuous measurement of the magnetic field around the antenna; and
      determine a volume and a density of a material of an object that has generated a fluctuation of the magnetic field around the antenna based on the continuous measurement of changes in a magnitude of the magnetic field.

2. The door of claim 1, where the antenna is electrically connected to at least a metal part integrated with the door.

3. The door according to claim 1 comprising an inclinometer.

4. The door according to claim 1 comprising an accelerometer.

5. A home security system comprising the door according to claim 1 wherein the home security system is connected to an external integrated surveillance system.

6. A window comprising:
   an integrated camera;
   a controlled magnetic field sensor connected to an antenna comprising a single electrode, which at a same time is a transmitter and a receiver of a magnetic field, such that said controlled magnetic field sensor measures disturbances of the magnetic field around said antenna;
   wherein the controlled magnetic field sensor is configured to:
      detect a disturbance in the magnetic field detected by the antenna and establish if there is a presence of a person depending on a power of the disturbance; and
      send an alert for the presence of the person together with images taken by the integrated camera;
   wherein the controlled magnetic field sensor comprises a processor configured to:
      perform continuous measurement of the magnetic field around the antenna; and
      determine a volume and a density of a material of an object that has generated a fluctuation of the magnetic field around the antenna based on the continuous measurement of changes in a magnitude of the magnetic field.

7. The window of claim 6 where the single electrode is electrically connected to at least a metal part integrated with the window.

8. The window according to claim 6 comprising an inclinometer.

9. The window according to claim 6 comprising an accelerometer.

10. A home security system comprising the window according to claim 6 wherein the home security system is connected to an external integrated surveillance system.

11. An architectural enclosure comprising:
    a controlled magnetic field sensor connected to an antenna comprising a single electrode, which at a same time is a transmitter and a receiver of a magnetic field, such that said controlled magnetic field sensor measures disturbances of the magnetic field around said antenna;
    wherein the electrode is made of adhesive material and has a maximum length of 10 meters configured as a magnetic field generation and measuring element connected to the controlled magnetic field sensor;
    wherein the electrode is constructed on a flexible and adhesive substrate and is composed of metal alloys;
    wherein the controlled magnetic field sensor is configured to:
       detect a disturbance in the magnetic field detected by the antenna and establish if there is a presence of a person depending on a power of the disturbance; and
       send an alert for the presence of a person; and
    wherein the controlled magnetic field sensor comprises a processor configured to:
       perform continuous measurement of the magnetic field around the antenna; and
       determine a volume and a density of a material of an object that has generated a fluctuation of the magnetic field around the antenna based on the continuous measurement of changes in a magnitude of the magnetic field.

12. The enclosure of claim 11, wherein the electrode is integrated inside the enclosure.

13. The enclosure of claim 11 comprising an outer enclosure.

14. The enclosure of claim 11 comprising an inner enclosure.

15. A home security system comprising the architectural enclosure according to claim 11 wherein the home security system is connected to an external integrated surveillance system.

* * * * *